US 11,379,490 B2

(12) United States Patent
Zimmerman

(10) Patent No.: US 11,379,490 B2
(45) Date of Patent: Jul. 5, 2022

(54) DYNAMIC INJECTION OF RELATED CONTENT IN SEARCH RESULTS

(71) Applicant: Google LLC, Mountain View, CA (US)

(72) Inventor: Jared Zimmerman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/946,150

(22) Filed: Jun. 8, 2020

(65) Prior Publication Data

US 2021/0382905 A1 Dec. 9, 2021

(51) Int. Cl.
*G06F 16/2457* (2019.01)
*G06F 16/9538* (2019.01)
*G06F 3/0482* (2013.01)
*G06F 3/0485* (2022.01)
*G06F 16/955* (2019.01)

(52) U.S. Cl.
CPC ...... *G06F 16/24578* (2019.01); *G06F 3/0482* (2013.01); *G06F 3/0485* (2013.01); *G06F 16/9538* (2019.01); *G06F 16/9558* (2019.01)

(58) Field of Classification Search
CPC .............. G06F 16/24578; G06F 16/9538
See application file for complete search history.

(56) References Cited

U.S. PATENT DOCUMENTS

| 7,693,869 | B2 | 4/2010 | Hutson et al. | |
|---|---|---|---|---|
| 2009/0240683 | A1* | 9/2009 | Lazier | G06F 16/951 |
| 2014/0032311 | A1* | 1/2014 | Cramer | G06F 16/248 705/14.45 |
| 2014/0280890 | A1* | 9/2014 | Yi | H04L 67/22 709/224 |
| 2015/0193390 | A1 | 7/2015 | Stekkelpak et al. | |
| 2016/0307281 | A1* | 10/2016 | Canis | G06Q 30/0631 |
| 2018/0011854 | A1 | 1/2018 | Yi et al. | |

FOREIGN PATENT DOCUMENTS

WO    WO-2011117320 A1 *   9/2011   .......... G06F 16/951

* cited by examiner

*Primary Examiner* — Asher D Kells
(74) *Attorney, Agent, or Firm* — Brake Hughes Bellermann LLP

(57) ABSTRACT

Systems and methods inject related content to a search result using a dwell score. For example, a method may include, for at least one result at least partially displayed in a viewport, calculating a dwell score for the result at based on an amount of time the result has been in the viewport and a position of the result in the viewport and, if the dwell score meets a threshold, displaying suggested links for the result in the viewport. Another example method includes displaying a scrollable set of search results in a viewport and, while waiting for a scroll action or link selection, calculating a dwell score for at least one result that has content visible in the viewport and updating ranking signals based on the dwell score. The updated ranking signals are used to generate a next set of search results for the query.

21 Claims, 11 Drawing Sheets

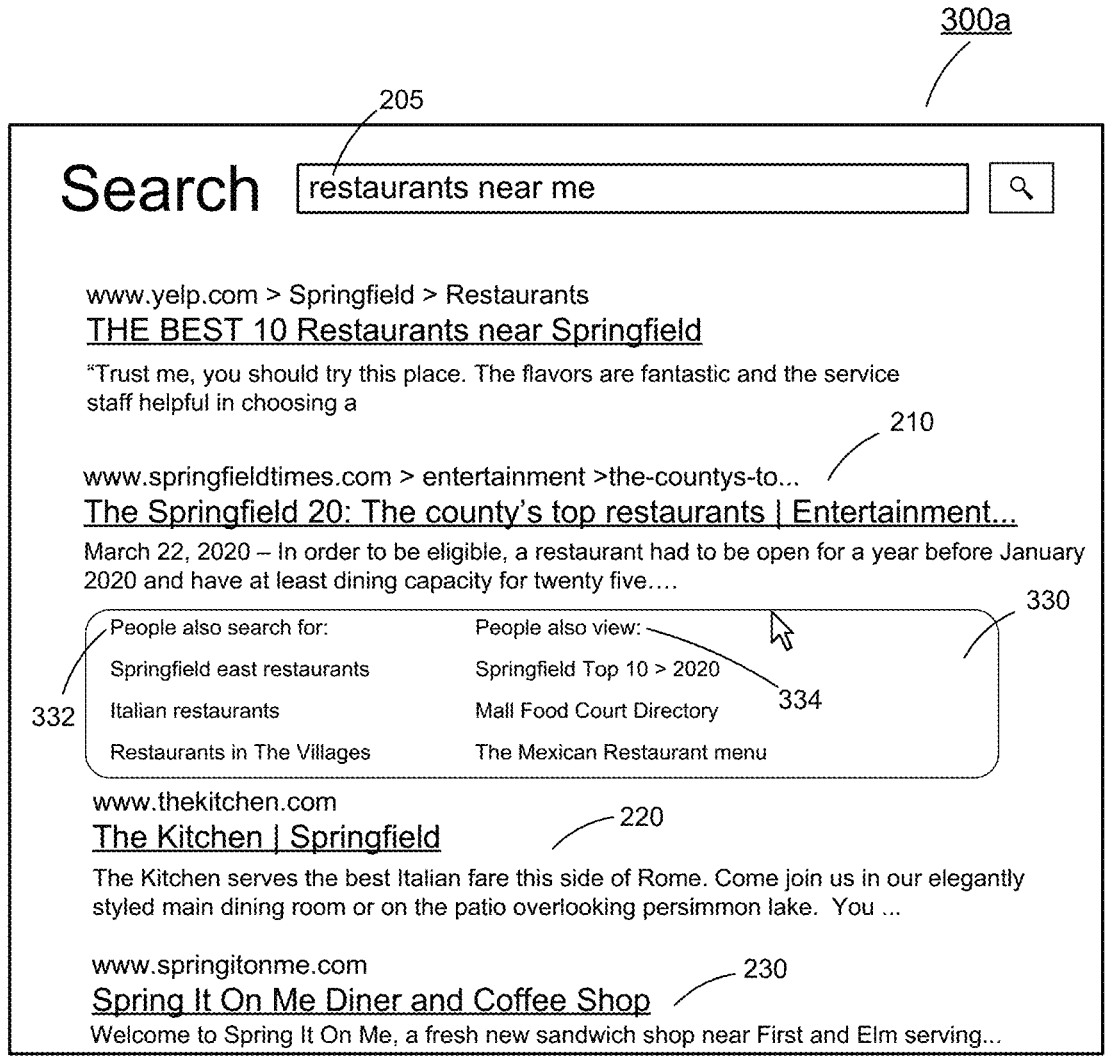
FIG. 3A

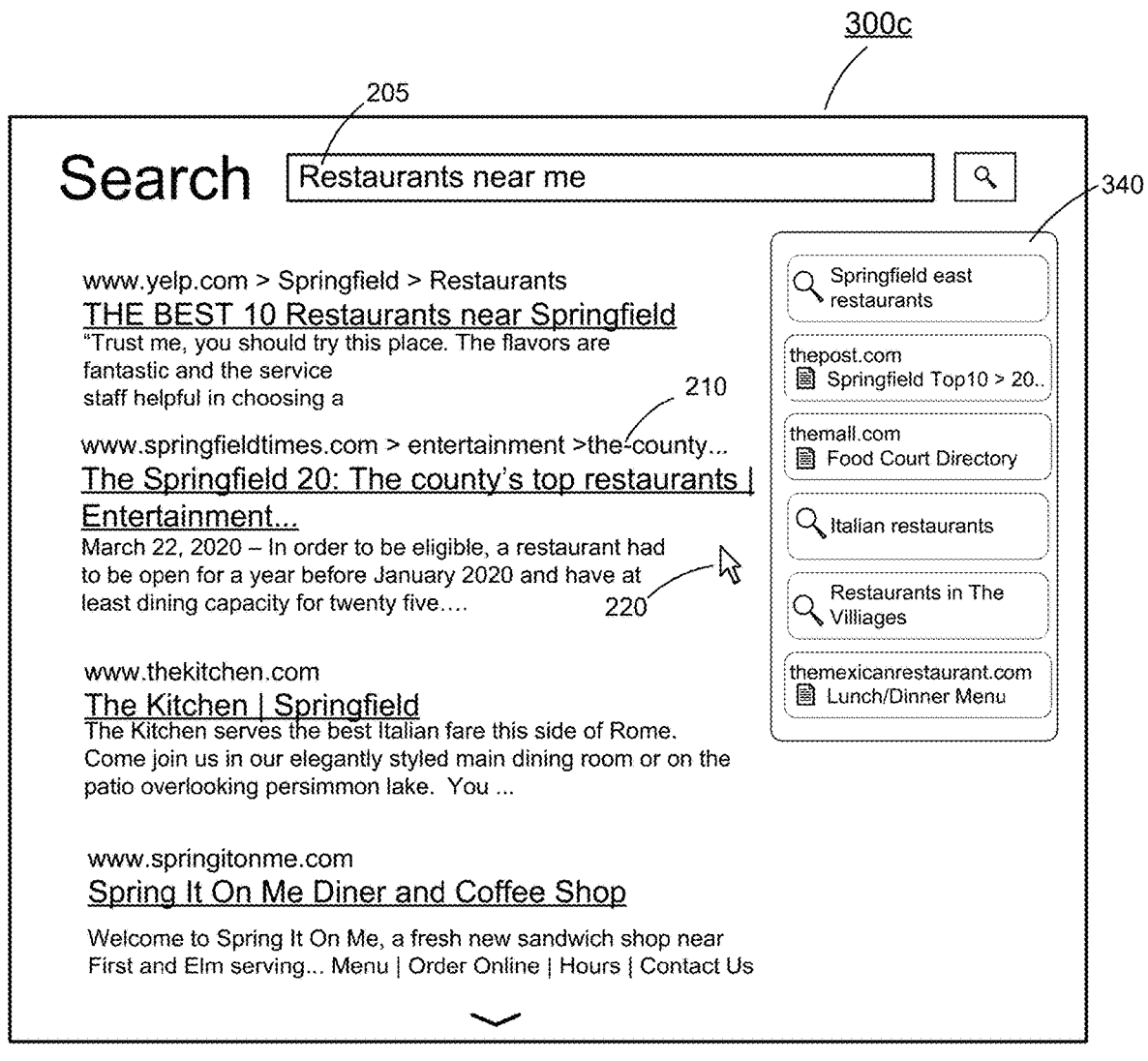
FIG. 3C

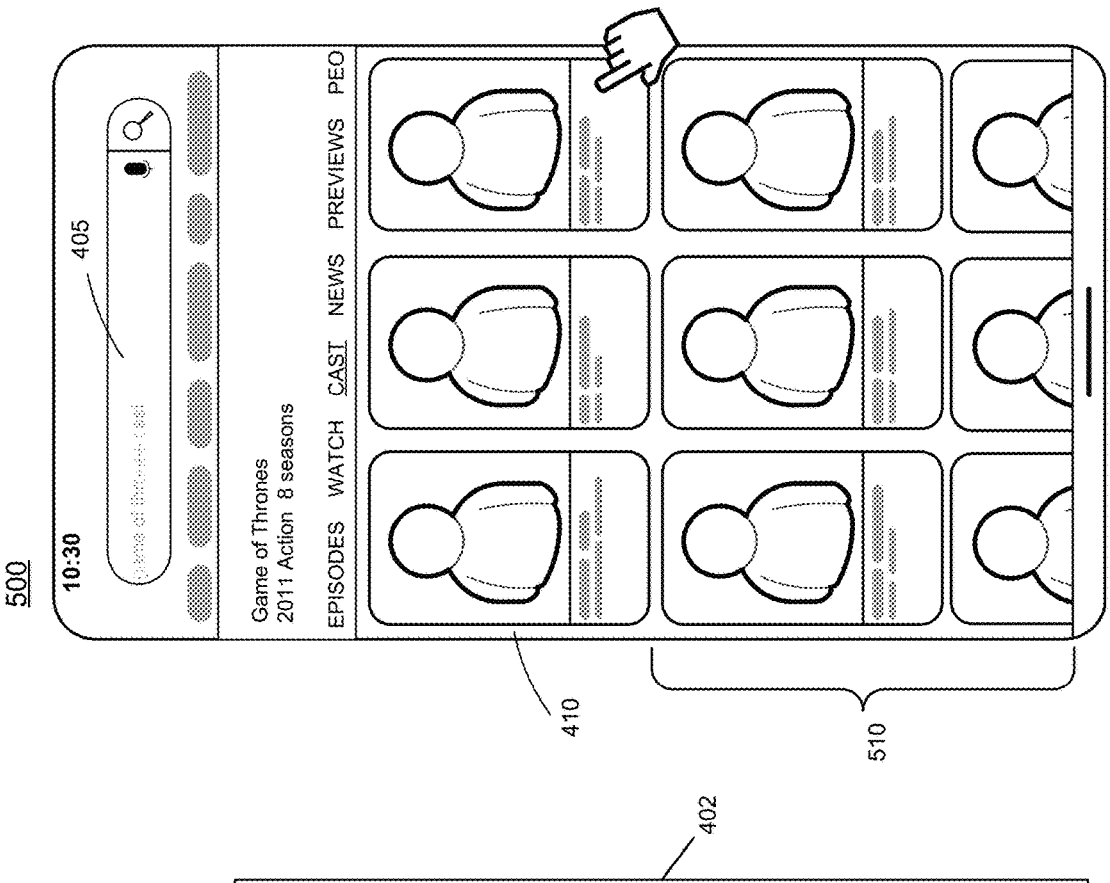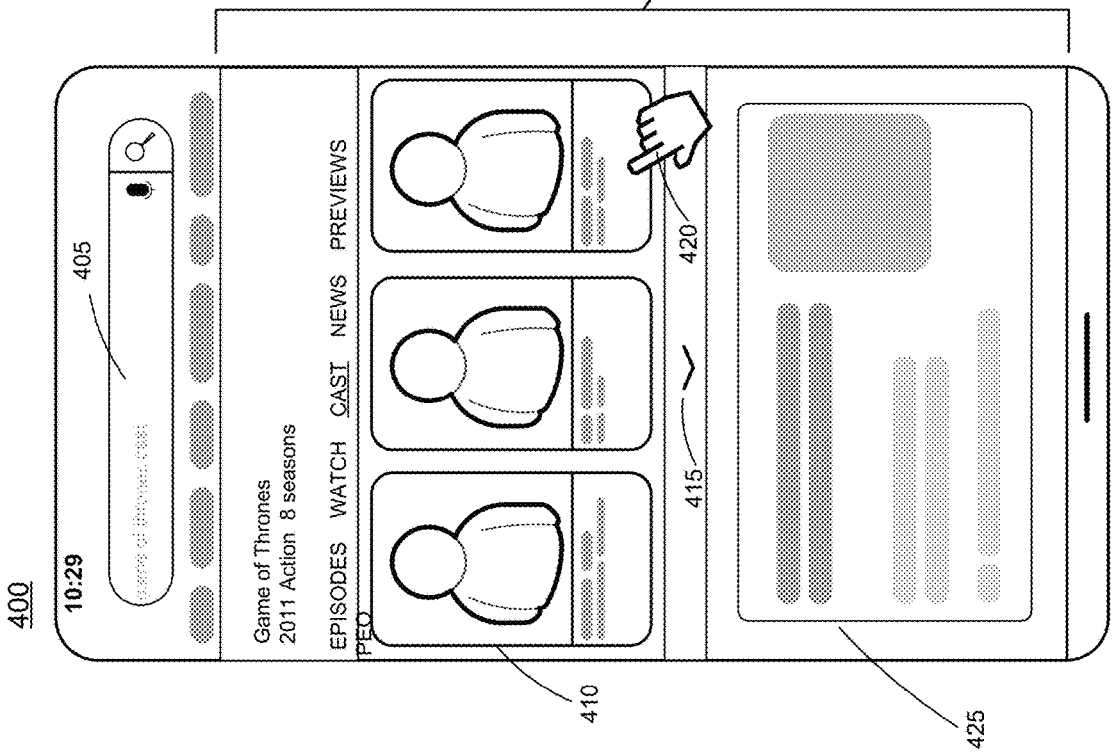

DYNAMIC INJECTION OF RELATED CONTENT IN SEARCH RESULTS

BACKGROUND

Search engines traditionally search for query terms that appear in documents, such as web pages accessible over the Internet. Content that the search engine returns in response to the query is referred to as the search results for the query. Each search result typically includes a link and a snippet and may include additional content, such as an image and/or a title, etc. A search engine uses several ranking signals to determine which search results are provided in response to the query and to order of the results. Research shows that most users interact with results in a diminishing fashion, with fewer interactions for results further from top results A user usually interacts with one (or more) of the results in the top results, e.g., top 10, top 20, etc. These results often are listed in the first page or second page of results. The number of search results shown in each page depends on the search engine used, a user's preferences and settings, and the type of display, e.g., personal computer vs. mobile phone. Users who do not find a helpful result in the first few pages tend to abandon or reformulate the search.

SUMMARY

Implementations use a dwell signal to display related suggested items and/or to influence "next page" search results for dynamic pagination. For example, some implementations may calculate related suggestions for a search result presented in response to a query. The suggestions may include refined queries and/or links to specific items. One or more of the search results initially presented to the user may have related suggestions. Implementations calculate a dwell score for search results that are in the viewport, e.g., visible to the user without scrolling. If a dwell score for a particular search result meets specified criteria, implementations may display the related suggested items. The related suggestions may be highly related to the search result or may be tangential to the search result. The additional suggestions may include documents or queries that can help the user refine the search. In addition, or instead, the suggestions may offer tangential suggestions that take the user in a slightly different direction, e.g., offering related queries, alternate interpretations of the query terms, and/or documents in a same category/classification as the particular search result but not highly similar to the result.

As another example, some implementations may use the dwell scores in generating a "next page" of search results for a query. Conventionally, a search engine may precompute a large (e.g., 100 or more) set of search results for a query and provides the large set in response, although only a few (e.g., 10 or so) may be displayed in a first page, with remaining results visible after a "next page" request by the user. Instead of precomputing a large set of search results, implementations may precompute a much smaller set (e.g., 20) of results. If the user provides a "next page" request, implementations may use dwell scores for the first set to inform the search results computed for the next page. The next page may include another small set of results, which may include some of the original smaller set that were not included in the first page as well as results added due to the dwell score signals. Thus, implementations may support dynamic pagination of search results and use a dwell score (or scores) to determine which search results are provided next. Dynamic pagination may be utilized irrespective of manual pagination; in other words, the user may interact with a "next page" type UI element or via automatic in-line pagination, which appends new results to the existing page.

According to certain aspects of the disclosure, a method comprises, for each result at least partially displayed in a viewport, the result being part of a reduced set of results identified in response to a query, calculating a dwell score for the result based on an amount of time the result has been in the viewport and a position of the result in the viewport, and responsive to determining that the dwell score meets a threshold, displaying suggested links for the result in the viewport.

According to certain aspects of the disclosure, a method includes receiving a query from a client device, determining a first plurality of search results from an inverted index that are responsive to the query, and providing the first plurality of search results for display in a viewport at the client device. The method may also include receiving a dwell score for at least a first result of the first plurality of search results, receiving a request for a next page of search results, determining a second plurality of search results from the inverted index that are responsive to the query, and ranking the second plurality of search results based on part on the dwell score so that results from the second plurality of search results that are similar to the first result receive a boost in rank.

According to certain aspects, a method includes displaying a scrollable set of search results in a viewport, wherein the set of search results represents a reduced set of search results responsive to a query, and, while waiting for a scroll action or link selection, calculating, for each result in the set of search results that has content visible in the viewport, a respective dwell score and updating ranking signals based on the respective dwell scores, wherein the updated ranking signals are used to generate a next set of search results responsive to the query responsive to a request for a next page of search results.

In another aspect a tangible computer-readable storage medium having recorded and embodied thereon instructions that, when executed by one or more processors of a computer system, cause the computer system to perform any of the methods or operations previously described.

One or more of the implementations of the subject matter described herein can be implemented so as to realize one or more of the following advantages. As one example, the system may initially select a much smaller set results (e.g., 15 or 20 instead of 100) for the search result, which saves time and can lead to faster generation of a result page. In addition, implementations improve the quality and relevance of the results that appear on a "next page" by using information about which results a user paused over to inform the selection and ranking of further results. This has a benefit of reducing the number of queries a user is likely to submit before arriving at an answer. As another example, implementations provide automatic assistance to a user. For example, when a user dwells on a search result page but does not scroll (change the viewport) or interact with the individual results, the user may be stuck, e.g., not knowing how to proceed. Implementations provide programmatic and unobtrusive assistance with suggestions that are both highly similar and tangential. The highly similar suggestions may help the user refine the query, e.g., representing results that are close to what the user is considering (e.g., based on the dwell score for a particular result). The tangential suggestions may help the user explore different but related content, e.g., helping a user who is stuck, e.g., a user not finding the sought for content but not sure how to obtain the sought for content. Implementations may also include sponsored content in the tangential and/or highly related suggestions, which provides the user with an opportunity to become aware of content relevant to interests of the user. As another example, implementations may inject content by automatically expanding lists, such as grid packs, without making the user expressly expand the list. Automatic expansion of a list can reduce user input, reduces network bandwidth usage by helping a user arrive at the right intention more quickly. Implementations are thus directed to generation and use of a novel signal for a search system.

The details of one or more implementations are set forth in the accompanying drawings and the description below. Other features will be apparent from the description and drawings, and from the claims.

BRIEF DESCRIPTION OF DRAWINGS

FIGS. 3A-3E illustrate example injections of related content into the viewport of FIG. 2, in accordance with some implementations.

FIG. 4 illustrates an example of a user viewport showing search results for a query.

FIG. 5 illustrates an example injection of related content into the viewport of FIG. 4, in accordance with some implementations.

Like reference symbols in the various drawings indicate like elements.

DETAILED DESCRIPTION

Implementations include systems and methods for injecting content into a search result without explicit user action. Disclosed implementations use a dwell signal to provide additional content to the user. A dwell signal is used as an indication of user inactivity. In other words, when search results are presented to a user, if the user is not changing the content in the viewport (i.e., is not scrolling) and does not select any of the search results, the user is dwelling on the search results in the viewport. This may be because the user is consuming content in the snippets, the user has walked away, the user may not find the search results offered in the first page of results helpful, or the user is stuck and does not know how to proceed. If the user dwells long enough on the page, implementations may automatically inject suggestions for the user into the content. The injected content, in the form of suggested items, may assist the user in more quickly finding relevant content. In some implementations, the items that the user spends more time dwelling on (reflected in the dwell scores for those items) may provide a signal of the kinds of content the user considered more helpful, even if not helpful enough to select. These signals can inform a next set of search results, should a next page of results be requested by the user.

Figure 1:
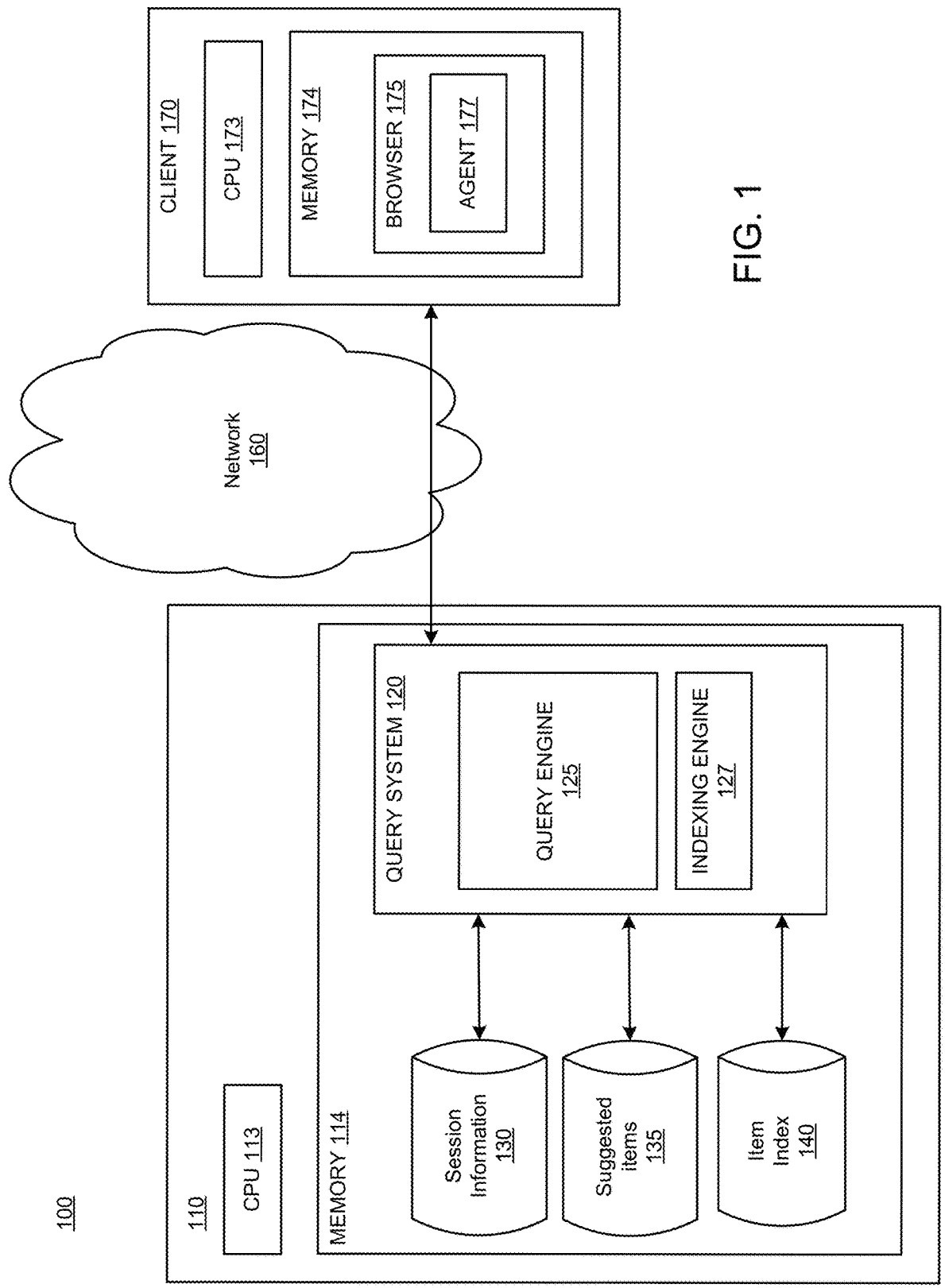
FIG. 1 illustrates an example system in accordance with some implementations.

FIG. 1 is a block diagram of a search service system 100 in accordance with an example implementation. The system 100 may be used to implement a search service that uses a dwell score to automatically inject related suggested content into a search interface. The depiction of system 100 in FIG. 1 is described as a search service for content accessible by the Internet that is configured to generate and use dwell scores for search results generated in response to a query. Other configurations and applications of the described technology may be used. For example, the dwell score may be used in similar interactions with non-Internet sources, such as a company's internal documents or items in a corpus secured by a login (e.g., a members-only library). Implementations can be applied in any setting where a search service provides search results via a browser.

Figure 8:
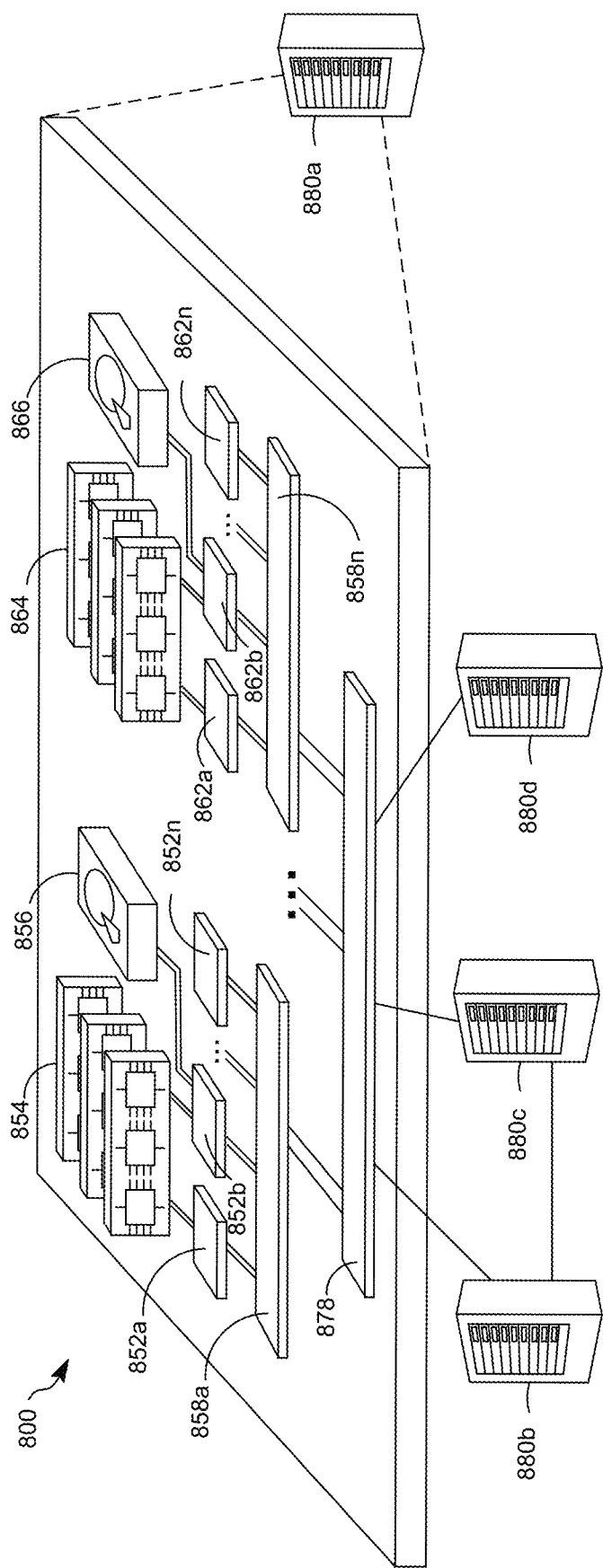
FIG. 8 shows an example of a distributed computer device that can be used to implement the described techniques.

The search service system 100 may include search engine 110. The search engine 110 may be computing devices that take the form of a number of different devices, for example a standard server, a group of such servers, or a rack server system. In some implementations, search engine 110 may be a single system sharing components such as processors and memories. In addition, search engine 110 may be implemented in a personal computer, for example a laptop computer. The search engine 110 may be an example of computer device 800, as depicted in FIG. 8. Search engine 110 may include one or more servers that receive queries from a requestor, such as client 170 and provide search results to the requestor.

The search engine 110 may include one or more processors 113 formed in a substrate, an operating system (not shown) and one or more computer memories 114. The computer memories 114 may represent any kind of memory (e.g., RAM, flash, cache, disk, tape, etc.). The memory 114 may represent multiple kinds of memory. In some implementations (not shown) the memory 114 may include external storage, e.g., memory physically remote from but accessible by search engine 110. The search engine 110 may include one or more modules or engines representing specially programmed software. For example, the search engine may include query system 120 that enables the search engine 110 to receive and respond to queries.

The query system 120 may itself include modules. For example, the query system 120 may include a query engine 125 and an indexing engine 127. The indexing engine 127 may be configured to update item index 140. For example, the indexing engine 127 may add items to item index 140, update items in index 140, and delete items from index 140. In some implementations, the indexing engine 127 may work with one or more crawlers. A crawler searches for items accessible via the Internet and returns content (including metadata) for the items. The indexing engine 127 may use the content and/or metadata to generate and update the index 140.

The query system 120 may also include a query engine 125. Query engine 125 may receive queries from requestors, such as client 170, analyze the query to determine how to search item index 140, and to initiate the search of the item index 140. A user may submit a query, e.g., a word, a phrase, a list of words, an image, a recording etc., to search engine 110. The search engine 110, specifically the query engine 125, uses one or more indices (item index 140) to identify items that are returned in response to the query. Items returned to the query engine 125 in response to the query ma also be referred to as responsive items. The query engine 125 may generate a search result for some or all of the responsive items. As used herein, a search result is data relating to a responsive item. The search result may include a link. The link may initiate some action related to the responsive item. For example, a search result link may take the user to a web page, may start paying a video or audio file, may open a map application to a certain geographic location, may initiate a phone call, or perform some other action. A search result for an item may also include a small image or icon relating to the item. For example, a search result relating to an actor may include an image of the actor. A search result for a web page may include a preview of the web page, etc. A search result for an item may include a brief description of the item or information extracted from the item, also referred to as a snippet. A search result may include other information related to and/or describing the item.

Query engine 125 may rank the responsive items. Ranking can include applying one or more ranking signals to a responsive item. Ranking signals can include many factors. Non-limiting examples are a PageRank for the item, a relevance score for the item, a source of the item, and many others. In addition to known ranking signals, the query engine 125 may also utilize a dwell signal for ranking. The dwell signal may be used in dynamic pagination.

In many conventional search engines, the query engine generates a large set of responsive items for a query, e.g., a set with hundreds of members. Many search engines organize the responsive items into pages. Each page may have a pre-set number of responsive items. Thus, for example, the first ten responsive items may be returned as a first page, the next ten may be on a second page, etc. A user may use links or controls to move between pages, e.g., requesting a last page, a next page, a previous page, etc. Thus, conventional search engines pre-generate a large set of responsive items and enable a user to page through the pre-generated set. Pre-generation means the items represented in the pages are set at the time the first page of search results is presented to the user.

In contrast, in dynamic pagination the next page of responsive items is not pre-generated. Instead, the query engine 125 may re-rank the remaining responsive items and/or run a revised query before providing the next page of search results. Put another way, in dynamic pagination a query engine may use information not available when the query was first executed to refine the responsive items presented in a next page of search results. Refining may include boosting a rank of one or more responsive items based on the additional information, e.g., so that a responsive item moves to the next page of results in response to the boost in rank. In such an implementation, the responsive items may be pre-generated but the ranking of the items may change based on the additional information. In such an implementation, once a responsive item included on a page that is viewed by a user the page assignment of that item may not change. Thus, the re-ranking may be applied to remaining items, or in other words items not yet presented to the user. Refining may include generating a new list of responsive items using a modified query based on the additional information. In such an implementation, the query engine 125 may generate a much smaller set of responsive items, e.g., 15 rather than 100 or 200. Responsive to a user's request for a next page of search results the query engine 125 may run the revised query to get the next set of responsive items, e.g., another 15 responsive items. In such implementations, the query engine 125 may return the first page of results faster using less bandwidth than an implementation where the query engine 125 generates a large set of responsive items. The additional information used in dynamic pagination may include dwell information obtained during presentation of the current page of search results to the user. The dwell information may be obtained using an agent of the search engine 110, e.g., agent 177, as explained herein.

In finding responsive items, the query system 120 may be responsible for searching one or more indices, represented collectively as item index 140. The item index 140 may include a web document index, e.g., an inverted index that associates terms, phrases, and/or n-grams with documents. Web documents can be any content accessible over the Internet, such as web pages, images, videos, PDF documents, word processing documents, audio recordings, etc. The item index 140 may also include an index of entities, for example from a knowledge base or knowledge graph. In a knowledge graph entities are modeled as nodes and facts about the entities are modeled as attributes or labeled relationships between entities. As used herein, an entity may refer to a physical embodiment of a person, place, or thing or a representation of the physical entity, e.g., text, or other information that refers to an entity. For example, a node representing Eiffel Tower may be linked to a node representing Paris by a located in relationship. The Paris entity may have an attribute representing geographic coordinates and may be linked to a node representing France by a located in relationship. The item index 140 may also include an index of advertisements, which associates terms or phrases with advertising campaigns. Thus, a responsive item may be an advertisement from a campaign. The item index 140 may also include an index of proprietary documents, e.g., documents (including image, audio recordings, videos, etc.) accessible only via authentication. Accordingly, as used herein, items can refer to web documents, entities, ads, proprietary documents, images, recordings, etc.

The item index 140 may be stored on a tangible computer-readable storage device, for instance disk, flash, cache memory, or a combination of these, configured to store data in a semi-permanent or non-transient form. In some implementations. index 140 may be stored in a combination of various memories. The query engine 125 may obtain responsive items from the item index 140, rank the responsive items, generate a search result for at least some of the responsive items, and provide the search results to the query requestor, e.g. client 170.

In addition to finding responsive items, the query system 120 may also identify suggested items, e.g., from suggested items 135 or from the responsive items for the query. The suggested items may be related to the query. The suggested items may be related to a specific responsive item. The suggested items may include additional responsive items not initially displayed in the search results page. For example, the query system 120 may identify a list of responsive items that are of a similar type, category, etc., such as a list of actors appearing in a specific movie or a list of businesses of a certain type "near me". In some implementations, the query system 120 may select some of the items from the list for display as a combined search result, such as a rich feature. At least some of the remaining items in the list may be provided as suggested items for the rich feature, e.g., as illustrated in FIGS. 4 and 5.

As another example, the query system 120 may use suggested items 135. Suggested items 135 may include items pre-computed (e.g., in a process occurring before receipt of the query) as being related to the query and/or a responsive item. For example, suggested items 135 may include queries that commonly follow the received query, as determined by analyzing search records. Search records may include aggregated search logs, aggregated data gathered from queries, or other aggregated data regarding previously processed queries. In some implementations, the search records may be generated by search engine 110 in the normal process of generating search results. In some implementations, the suggested follow-on queries may be ranked by similarity to the query and/or the number of times the suggested query follows the received query. In some implementations, the suggested follow-on queries may be ranked by similarities with information in the session information 130. Thus, a suggested query may be tangential to the received query and/or the responsive item but be highly related to information in the session information 130. In some implementations, the suggested follow-on queries may be related to a specific responsive item. For example, the responsive item may be associated with one or more queries, e.g., because the responsive item has been selected often after being presented as a search result for the related queries. If the responsive item has related queries these queries may be included as suggested items for the responsive item. For example, the suggested items 135 can include parts of a topic journey that other users have taken. For instance, if the current query is "jobs in Pittsburgh" the search system may suggest "housing in Pittsburgh" or "best elementary schools in Pittsburgh" as a suggested item 135. As another example, the suggested items 135 may include alternate interpretations of a query term. For instance, the query "jaguar" may result in "jaguar car," "jaguar cat," and/or "jaguar team" as suggestions. Similarly, suggested items 135 may include alternate possibilities. For example, a query of "washing machine" may have as suggested items 135 "new washing machine" or "washing machine repair" while a query of "university" may include "trade school" or "journey program" as a suggested item 135. Another example of suggestions tangential to a query are alternate viewpoints. For instance, a query of "How long should I foam roll after running?" may have as a suggested item "Should I foam roll after running?" or "Alternatives to foam rolling after running."

In a similar manner, a responsive item may be related to one or more other items, e.g., because they appear together in search result pages or because they include similar content. Thus, rather than including several items with similar content, the search engine may include a top-ranked item with similar content and use the other items as suggested items for the top-ranked item. As another example, the suggested items 135 can include advertisements. The query system 120 may include advertisements that match keywords in the query. The advertisement may be an item the sponsor has chosen to be associated with the keyword. In some implementations, a responsive item may be associated with one or more keywords and the advertisement may be a suggested item for the responsive item.

As indicated earlier, the search engine 110 may identify a set of suggested items for the query and/or a set of items for at least some of the responsive items included in the current search result page. Some implementations may associate an icon, or other visual queue with each suggested item. The icon may serve as an indication of the type of the suggested item. For example, suggested queries, suggested items, suggested entities, and suggested advertisements may each have a different visual queue. The query system 120 may apply a ranking of the suggested items. The query system 120 may provide information needed to display the suggested items as part of the response to the query, although this information and the suggested items themselves are not initially displayed. In such an implementation, the browser, e.g., browser 175, may be able to display one or more of the suggested items based on dwell scores without further communications with the search engine 110.

The query system 120 may be in communication with client(s) 170 over a network 160. Network 160 may be for example, the Internet, a cellular network, a wired or wireless local area network (LAN), wide area network (WAN), etc. The network 160 may represent multiple types of networks. Via the network 160, the query system 120 may communicate with and transmit data to/from clients 170 as well as with other domains (not shown).

Figure 7:
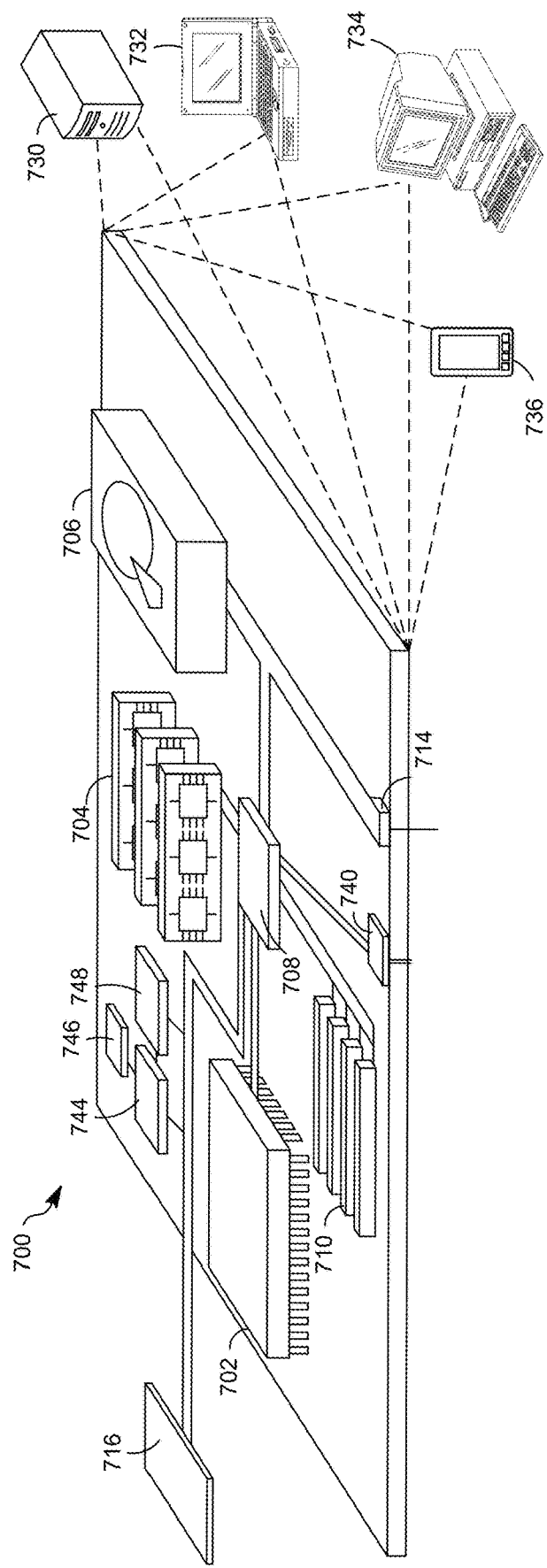
FIG. 7 shows an example of a computer device that can be used to implement the described techniques.

The search service system 100 may also include an agent 177 that runs on the client 170. The client 170 may be an example of computer device 700, as depicted in FIG. 7. For example, the client 170 may be a personal computer, a mobile phone, a tablet, a laptop, a wearable device, a smart television, or the like. Client 170 may include one or more processors 173 formed in a substrate configured to execute one or more machine executable instructions or pieces of software, firmware, or a combination thereof. The processors 173 can be semiconductor-based—that is, the processors can include semiconductor material that can perform digital logic. Client 170 can also include one or more computer memories 174. The memories 174, for example, a main memory, may be configured to store one or more pieces of data, either temporarily, permanently, semi-permanently, or a combination thereof. The memories 174 may include any type of storage device that stores information in a format that can be read and/or executed by the one or more processors 173. The memories 174 may store applications, modules and/or engines that, when executed by the one or more processors 173, perform certain operations. In some implementations, the applications, modules, or engines, may be stored in an external storage device and loaded into the memory 174.

The applications may include any number of applications configured to execute on the client 170, such as an operating system, a messaging application, shopping applications, editing applications, search assistants, maps, etc. In particular, the applications include a browser 175. The browser 175 is operable to receive web page code (e.g., HTML, JavaScript, etc.) and render the web page for presentation to a user of the client 170. The client 170 thus includes a display device with a viewport. As used herein a viewport is a polygon region displaying content rendered by a browser. Conventionally a viewport is rectangular. The size of the viewport is device dependent, e.g., a viewport on a smartphone is smaller than the viewport of a personal computer or tablet. The content of a rendered web page may not all fit in the viewport. In such an instance, the user may scroll, e.g., execute a scroll action, to bring content into the viewport and move content out of the viewport. A scroll action is any input that the browser 175 (possibly in conjunction with an operating system of client 170) recognizes as executing a scroll to move content into the viewport. Example scroll actions are actuating a wheel on a mouse, a click-and-drag action, a swipe action (e.g., using a finger or stylus), actuation of scroll bars in a browser window, etc. The browser 175 thus displays scrollable content (e.g., a rendered webpage) and the viewport determines what portion of the content the user of client 170 can actually see, or in other words what portion of the content is visible.

The browser 175 may include an agent 177. The agent 177 is a module or lightweight application that is installed with user consent. The agent 177 communicates with the query system 120. For example, the agent 177 may exchange session information 130 with the query system 120. Session information 130 may include data items used to provide certain search system functionality. Among other information included in the session information 130, the agent 177 may calculate a dwell score for one or more search results visible in the viewport. The agent 177 may calculate a dwell score for search items that are in the viewport when a user is not scrolling (performing a scroll action). In other words, while the user is actively scrolling, the agent 177 may not calculate any dwell scores. When a user stops scrolling the content in the viewport is fixed until the user performs another scroll action, selects a link, submits a different query, or switches focus. While the content in the viewport is fixed the agent 177 may periodically calculate a respective dwell score for each search result displayed in the viewport. In other words, each search result displayed in the viewport has its own dwell score, which the agent 177 may periodically update. The dwell score for a search result may be dependent on a number of factors. In some implementations, the dwell score may be a weighted combination of the factors. In some implementations, a machine learning algorithm, such as linear regression, logistic regression, a neural network, etc., may be used to determine the weights and/or whether the dwell score meets a threshold.

The factors may include the position of the search result in the viewport. For example, this factor may be lower for a search result appearing toward the bottom of the viewport (e.g., bottom third, bottom fourth, etc.) than a search result appearing toward the middle or top of the viewport. The factors may include how long the search result has been in the viewport. For example, this factor may increase the dwell score of a result the longer the result is in the viewport. The factors may include the amount of the search result that appears in the viewport. For example, a search result that is only partially in the viewport may receive a decrease or penalty to its dwell score. The factors may include the proximity of a cursor to the search result. In some implementations, the proximity of the cursor may be highly weighted. In some implementations, the proximity of the cursor may be weighted more than any of the other factors. A cursor may be an icon used in conjunction with a mouse, trackball, or trackpad. When the client 170 includes a touchscreen, a cursor may also be a location of a touch. For purposes of the dwell score, the cursor may be a stationary touch. A stationary touch occurs when the user touches a screen (e.g., with a digit or stylus) but does not change the location of the touch or remove the touch. In some implementations, such as a mobile device where the user has enabled eye tracking for the browser 175, the factors may include a proximity to a gaze direction. This factor may be weighted similar to the proximity of the cursor factor. The agent 177 may periodically calculate the dwell scores of search results in the viewports, e.g., so that the time in viewport can be accounted for. In some implementations, a search result may keep its last calculated dwell score after the result has been scrolled out of the viewport.

In some implementations, the agent 177 may inject content based on the dwell scores. For example, responsive to determining that one search result has a dwell score that meets (e.g., is greater than or equal to) a predetermined threshold, the agent 177 may automatically inject suggested items into the viewport. The suggested items may include items specific to the search result. The suggested items may include items for the query for which the search results were returned. In some implementations, the dwell score may meet the predetermined threshold if the proximity to cursor factor or the proximity to gaze direction factor indicates the gaze direction or the cursor overlaps with a portion of the search result and a time in the viewing area indicates a minimum time has been reached. In some implementations, the dwell score may meet the predetermined threshold if a time in the viewing area indicates a minimum time has been reached and the factor for the position in viewport is sufficiently high. Some implementations may use a machine learned classifier to determine whether the dwell score meets the predetermined threshold. The agent 177 may use a variety of methods to inject suggested items (also referred to as suggested links), as described in more detail with regard to FIGS. 2-3C, 4, and 5.

The agent 177 may also send dwell scores to the search engine 110. The dwell scores may be associated with session information, e.g., in session information 130. The dwell scores for a session may be deleted when the session is closed. In some implementations, the search engine 110, specifically the query engine 125, may use the dwell scores as one of the ranking signals for generating and serving a next page of search results as part of dynamic pagination. Specifically, as described herein, an item responsive to the query that is similar to a search result for another item that has a high dwell score may receive a boost in rank, as described in more detail with regard to FIGS. 3D and 3E.

Further to the descriptions above, a user of client device 170 may be provided with controls allowing the user to make an election as to both if and when systems, programs, or features described herein may enable collection of user information (e.g., information about a user's activities, a user's preferences, or a user's current location), and whether the user is sent content or communications from a server, such as search engine 110. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user of client 170 may have control over what information is collected about the user, how that information is used, and what information is provided to the user and/or to the search engine 110 or agent 177.

The client 170 may include one or more input devices, such as touch screen, keyboard, mouse, pointer, a microphone, a camera, one or more physical buttons, etc. The input devices may initiate input events, such as scrolling, link selection, cursor movement, which can be received and analyzed by the browser 175 and/or agent 177. The client 170 may also include communications devices operable to send and receive data from other computing devices, such as another client, servers, search engine 110, etc., over one or more networks, such as network 160. The configuration of FIG. 1 represents one example configuration and implementations may incorporate other configurations.

Figure 2:
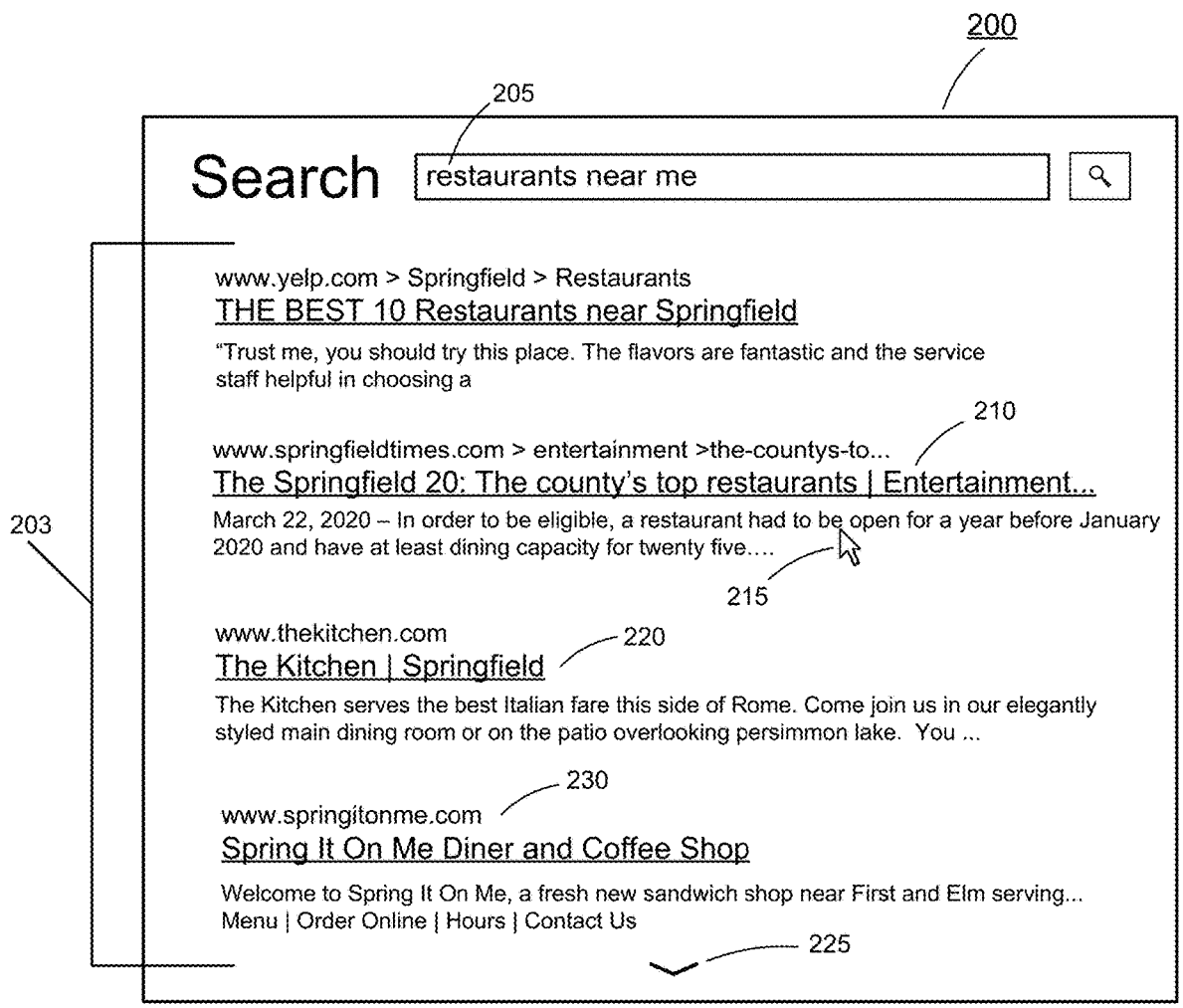
FIG. 2 illustrates an example of a viewport showing search results for a query.

FIG. 2 illustrates an example of a viewport 200 showing search results for a query. A query system, such as query system 120 of FIG. 1, may generate content to be rendered by a browser, such as browser 175 in response to a query 205. In the example of FIG. 2, a user has submitted a query 205 of "restaurants near me." The content in the viewport 200 includes a set of search results 203, e.g., search result 210, search result 220, search result 230, etc. Each search result is associated with a responsive item. The set of search results 203 may include additional search results not currently visible in the viewport 200. These additional search results may be moved into the viewport, e.g., via a scrolling action. The set of search results 203 may be considered a first page of search results. In the example of FIG. 2, a cursor 215 is also illustrated. The cursor 215 is proximate to the search result 210.

Figure 3B:
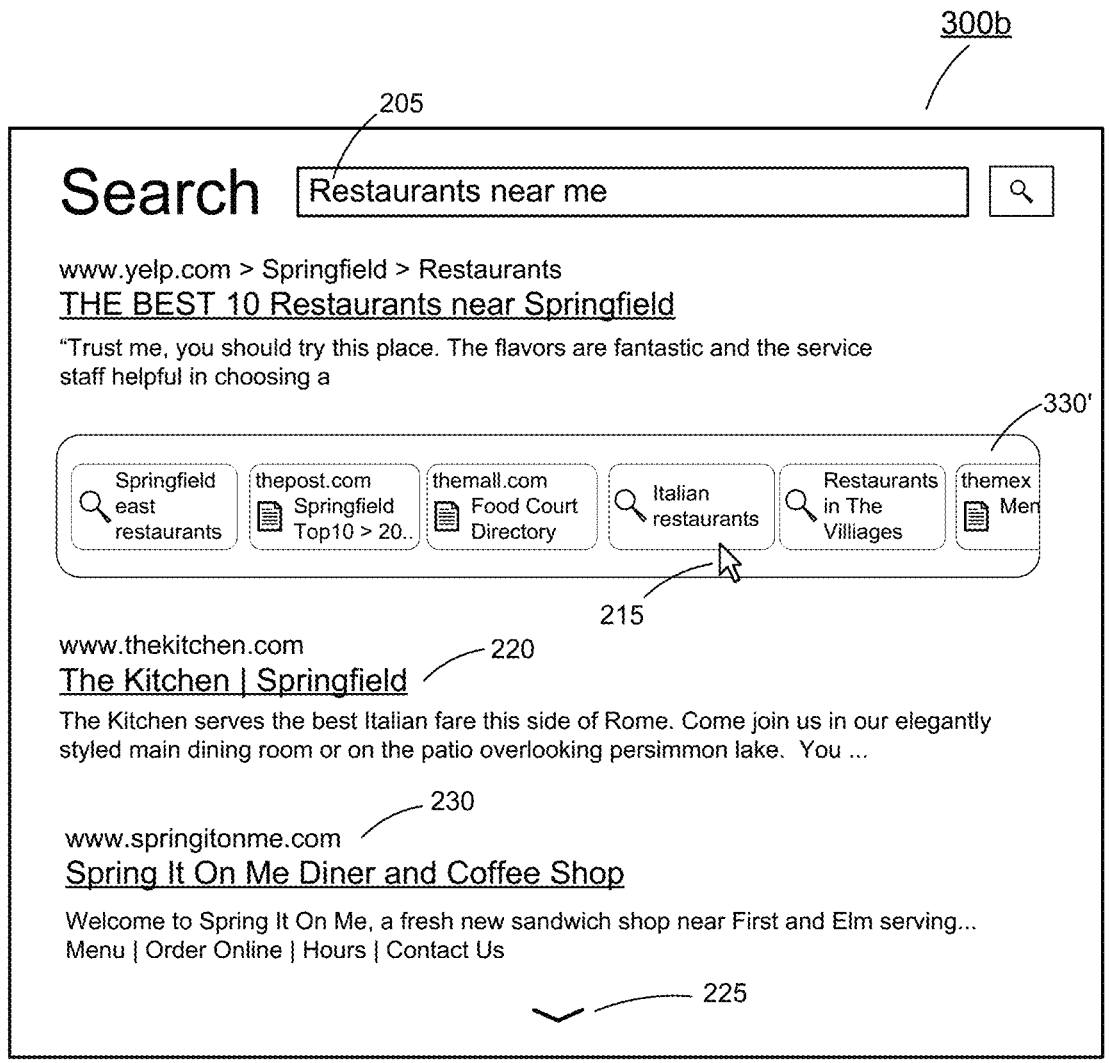

FIGS. 3A-3E illustrate examples of dynamically injecting suggested links based on a dwell score. FIG. 3A illustrates an example injection of suggested links into the viewport 200 of FIG. 2, in accordance with some implementations. In the example of FIG. 3A, the dwell score of search result 210 meets the predetermined threshold. As a result of determining that the dwell score meets the threshold, the system (e.g., via agent 177 of FIG. 1), injects suggested links 330 into the viewport, generating viewport 300a. The suggested links 330 represent content related to search result 210, which has a dwell score that meets the predefined threshold, and/or the query 205. In the example of FIG. 3A, the suggested links 330 are injected below the search result 210 and cause the other search results (220 and 230) to be scrolled down. In the example of FIG. 3A the suggested links 330 include suggested queries 332 and suggested documents 334. Although not illustrated in FIG. 3A, the suggested links may include suggested entities or an advertisement/advertisements. The suggested links 330 can include links that are similar to the responsive item for search result 210. For example, "Springfield east restaurants" and "Mall Food Court Directory" are highly similar to the search result 210. The suggested links 330 can also include tangential suggestions. For example, "Italian restaurants" and "the Mexican Restaurant menu" offer similar content as the search result 210 (e.g., relating to restaurants near me) but represent a more specific direction to the user. Tangential suggestions may be used by a user to refine the search in a direction not explicitly expressed in the query 205. In some implementations, tangential suggestions may be based on information about the session or user, with user consent.

In some implementations, the suggested links may be presented in a carousel. Suggested links 330' illustrates an example carousel. The suggested links 330' may replace suggested links 330 in the viewport 300a in some implementations. The suggested links 330' in the carousel may be scrollable. The suggested links may be listed with an icon that indicates a type of the link, e.g., whether the suggested link is a new query, a document, an entity, an advertisement, etc. For example, icon 336 may indicate that "Springfield east restaurants" is a query where icon 338 may indicate "thepost.com" is a document. FIG. 3B illustrates another injection of suggested links into the viewport 200 of FIG. 2. In the example of FIG. 3B the suggested links 330' replace the search result 210 in the viewport. Suggested links 330 of FIG. 3A could also replace the search result 210 in some implementations. Implementations using the technique of FIG. 3B have an advantage of not scrolling other search results, which can be advantageous for devices with smaller viewports, such as mobile phones.

FIG. 3C illustrates another injection of suggested links into the viewport 200 of FIG. 2. In the example of FIG. 3C, the viewport is split into a main content area 342 and a sidebar area 344. Implementations using the technique of FIG. 3C inject suggested links 340 into the sidebar area 344. As with FIGS. 3A and 3B, the suggested links 340 represent content relevant to search result 210, which has a dwell score that meets a predetermined threshold. The suggested links 340 include both similar and tangential (diverse) content related to the search result 210. The suggestions in suggested links 340 have a similar format as suggested links 330', e.g., in a carousel format, optionally with an icon that relates to the link and/or a type of the link. Other formats may be used, e.g., such as suggested links 340'. In some implementations, the suggested links 340 are anchored to the search result 210, i.e., the search result with the dwell score that resulted in injection of the suggested links.

Figure 3D:
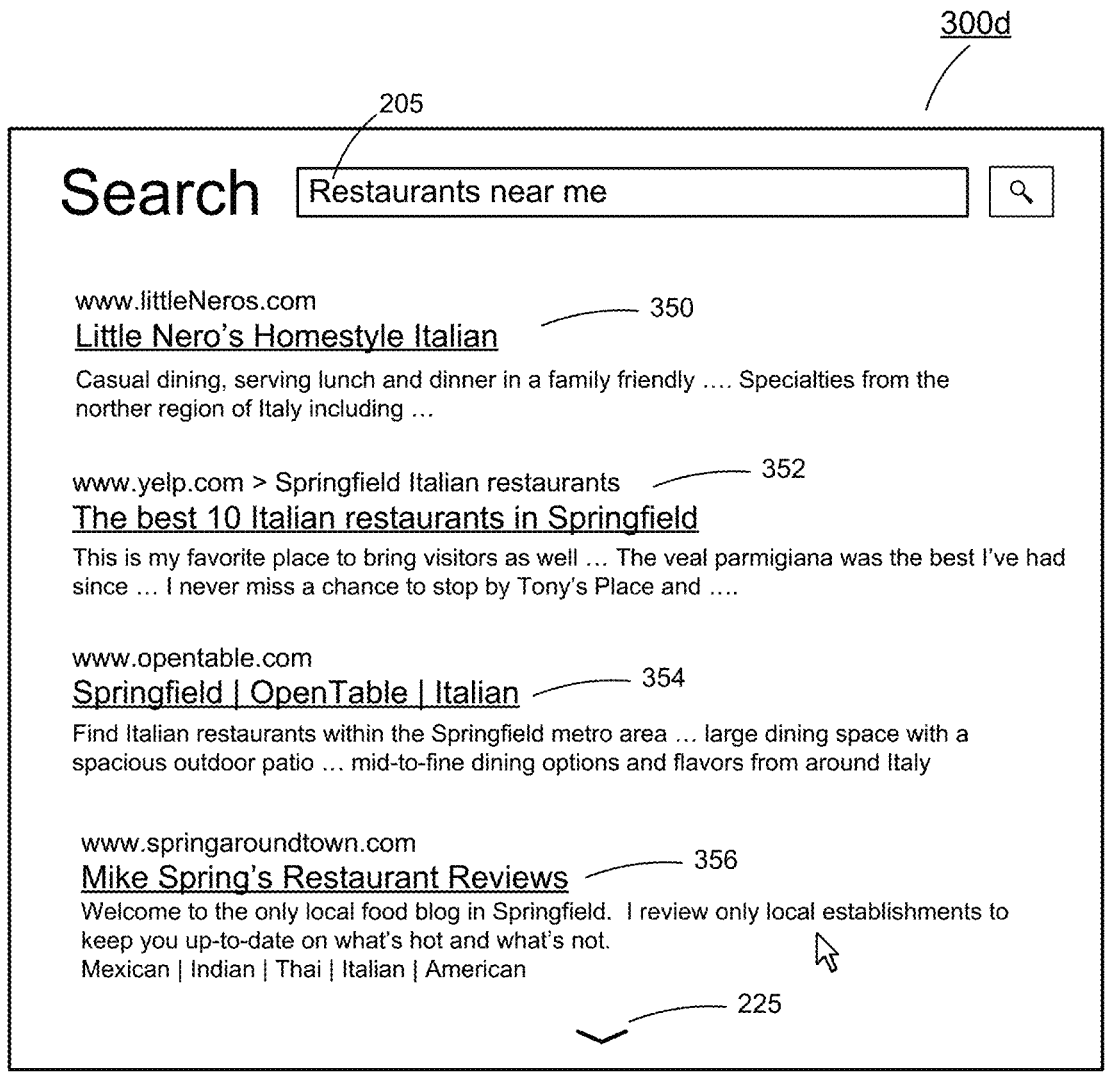
Figure 3E:

FIGS. 3D and 3E illustrates example dynamic pagination injections of related content into the viewport of FIG. 2, in accordance with some implementations. In the example of FIG. 3D, the user of a client device has been viewing viewport 200 and, therefore, each of the search results 203 in the viewport has a calculated dwell score. For the purposes of the example of FIG. 3D, the user positioned the cursor 215 near search result 220 for a majority of the time while the viewport 200 was stationary. Thus, in this example, search result 220 has a highest dwell score of the search results in the first page of results. The interface represented in viewport 200 includes a next page control 225. In the example of FIG. 3D, the user has selected the next page control 225. A next page control is any control that initiates a next page action. A next page action indicates the user desires to have the next set of search results displayed. If the user clicks on or otherwise selects the next page control 225, the search engine provides the next page of search results for rendering by the browser. Implementations are not limited to the exact representation of next page control 225 as illustrated in FIG. 2. For example, the next page control 225 may be some other icon or may be in the form of a selectable number (e.g., "page 1 2 3 . . . 12") or a "next page" or "more results" link. In some implementations the next page control 225 may be implied. In such an implementation, rather than a user selecting an icon or link, the system may employ an overscroll as the next page control 225. An overscroll occurs when a boundary of a scrolling area is reached. In other words, the browser has run out of content to display and scrolling stops. In some implementations, after this boundary is reached the user may perform a scroll action. If no action is defined for an overscroll the client device conventionally provides a bounce effect or page refresh. In some implementations, the overscroll may be interpreted as selection of a next page control. Put another way, the system may interpret an overscroll as a request for a next page of search results. Thus, next page control 225 can be any control or action that causes the browser to display a next page of search results for the query 205.

After the user selects the next page control 225, the system may generate a next set of search results for the query 205. The system may use the dwell scores for the search results in the first page as part of the ranking signals and/or as part of the criteria to select the search results for the next page. For instance, in the example of FIG. 3D, because search result 220 has a highest dwell score the search engine may boost the rank of items more similar to the item represented by search result 220, e.g., Italian restaurants. This boost in rank may result in more Italian restaurants being included in the search results included in the next page such as search result 350, as illustrated in FIG. 3D. In addition, review sites for Italian restaurants, such as search results 352 and 354 may receive a boost in rank and appear on the next page of results. Other items responsive to the query 205 not related to Italian restaurants may also be included in the next page, such as search result 356.

In the example of FIG. 3E, the user of a client device has been viewing viewport 200 and, therefore, each of the search results 203 in the view has a dwell score. For the purposes of the example of FIG. 3E, the user positioned the cursor 215 near search result 230 while viewing the first page of search results. Thus, in this example, search result 230 has a highest dwell score of the search results in the first page of results. In the example of FIG. 3E, the user has selected the next page control 225, indicating that the search engine should provide a next page (a second set) of search results. In generating the next page, the search engine uses the dwell scores of the search results 203, e.g., to select and/or rank the items returned. In this example, because search result 230 has a highest dwell score, at least some of the responsive items will be similar to the item associated with search result 230. Thus, for example as illustrated in FIG. 3E, the next set of search results may include other diners, such as search result 360. In addition, or alternatively, the next set of search results may include reviews related to American diners, such as search result 362 and search result 364. As with FIG. 3D, the next page of search results may also include other results responsive to the query 205 and not necessarily just those more similar to search result 230, e.g., search result 356.

FIGS. 3D and 3E are examples of how implementations may use dwell scores in dynamic pagination. For example, depending on the dwell scores for the search results in the first page of search results, e.g., the set of search results 203, the next page may include search results 350, 352, and 354 or the next page may include search results 360, 362, and 364. Thus, as illustrated by FIGS. 3D and 3E, implementations may use the dwell score to inject related suggestions in a next page of search results using dynamic pagination.

FIG. 4 illustrates an example of a user interface 400 showing search results for a query 405. In the example of FIG. 4, the query 405 is "game of thrones cast." The search engine may provide search results 410 and 425 in a first page of search results. The client device may display the first page of search results in viewport 402. Additional search results not shown in the viewport 402 may be returned as part of the first page of results. The user may scroll down to see these additional results. The search result 410 in the example of FIG. 4 is a grid pack. A grid pack is an example of a rich feature. A rich feature is a search result that includes graphical elements and sometimes facts relating to an item. Rich features can be presented in a box, such as a knowledge panel, or in a carousel format, or a grid pack. Where a carousel format is scrollable from left to right, a grid pack is generally scrollable up and down and initially presented in a collapsed state. For example, the grid pack of FIG. 4 may initially display three actors and a control 415 for expanding the grid pack. In the example of FIG. 4 each item in the grid pack includes a picture of the actor, the name of the actor and the role the actor played in Game of Thrones.

Some implementations may use a dwell score for search result 410 to automatically expand the grid pack, without requiring the user to explicitly select the control 415. For example, if the user holds a finger (e.g., cursor 420) in search result 410 the system may calculate a dwell score. The longer the user holds the finger proximate to the search result 410 the higher a dwell score for the search result 410 will be. Once the system determines that the dwell score satisfies (e.g., meets or exceeds) the threshold, the system may automatically expand the grid pack, as illustrated in FIG. 5. Thus, FIG. 5 illustrates an example injection of suggested content 510 into the viewport 402 of FIG. 4. The injection may cause other search results, such as search result 425, to scroll out of the viewport.

In any of the examples represented in FIGS. 2-5, the system may calculate a dwell score for injected content that is in the viewport. Thus, for example, once the grid pack is expanded the system may calculate a dwell score for each individual item in the grid pack. The dwell scores may then be used in dynamic pagination or to inject further suggested content. For example, in FIG. 3B the user may position a cursor 215 over the suggested link for "Italian restaurants". This may result in the suggested link having a dwell score that results in the search results illustrated in FIG. 3D after the user selects next page control 225 of FIG. 3B. In other words, a dwell score calculated for Italian restaurants may result in the interface of FIG. 3D in response to a request for a next page of results. Likewise, a dwell score for a particular actor in the suggested content 510 may cause a request for a next page of search results to include search results for items more closely related to that particular actor. Thus, implementations may enable suggested links to influence and inject suggested content for dynamic pagination. The suggested links may be implemented without dynamic pagination. Dynamic pagination may be implemented without suggested links. Suggested links may also be implemented with, but not influence dynamic pagination (e.g., some implementations may not calculate dwell scores for suggested items).

Figure 6:
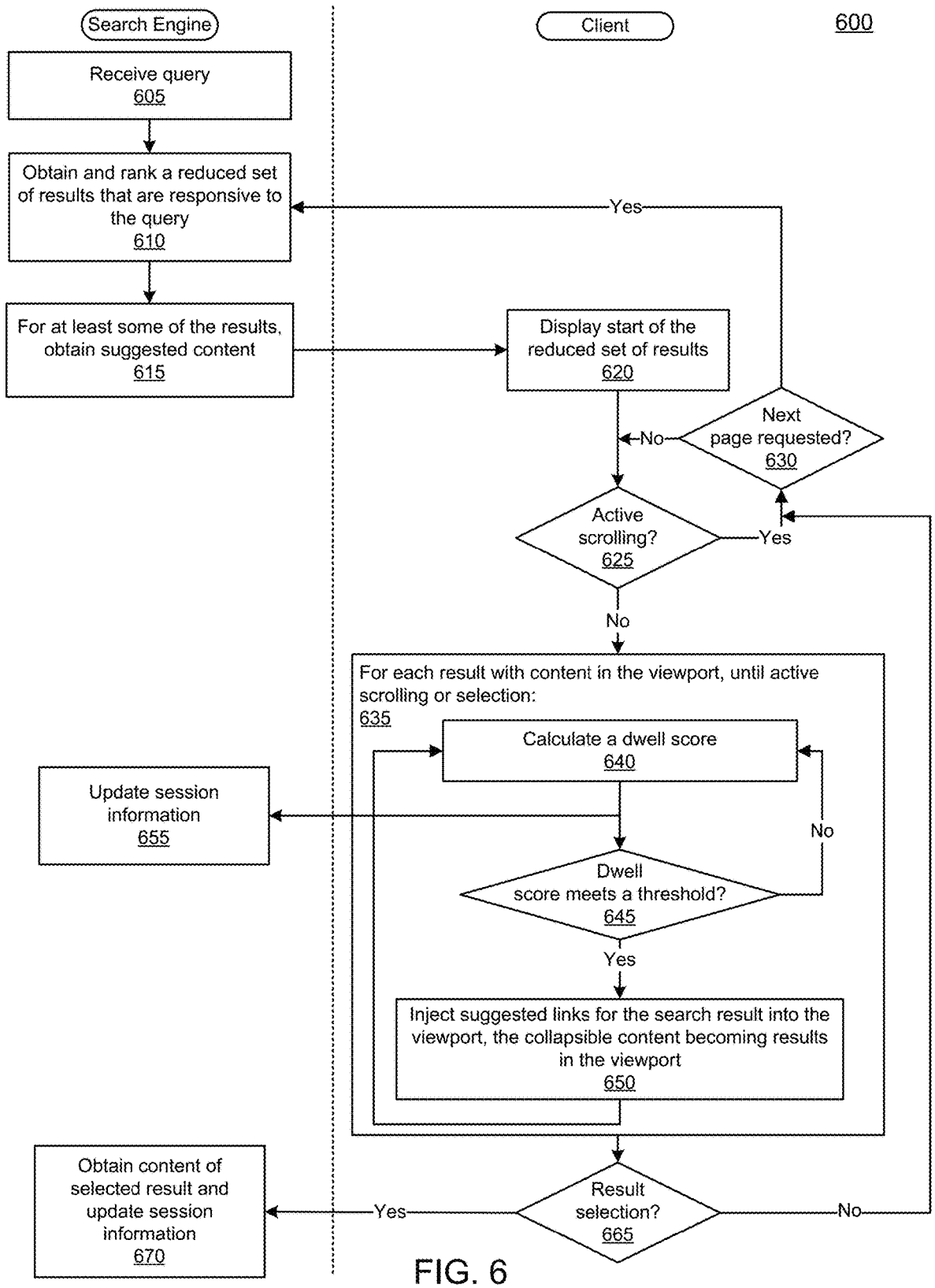
FIG. 6 illustrates a flow diagram of a process for injecting related content into search results, in accordance with some implementations.

FIG. 6 illustrates a flow diagram of a process 600 for injecting related suggested content into search results, in accordance with some implementations. Process 600 may be performed by a search service system, such as system 100 of FIG. 1. In particular process 600 may be performed in part by a search engine, such as search engine 110 of FIG. 1 and an agent on a client device, such as agent 177 of FIG. 1. Process 600 may be one process performed during a browsing session. Process 600 may begin in response to receiving a query from a requestor, e.g., from a client device (605). The system may obtain items that are considered responsive to the query, or in other words a set of responsive items (610). In implementations that use dynamic pagination, the number of items in the set of responsive items may be reduced compared with search engines that do not use dynamic pagination. For example, the set of responsive items may include 10 or 15 items rather than 100 or more. The system may rank the responsive items. The system may assign responsive items to a page, e.g., a first page, a second page. The search system may generate a search result for each responsive item assigned to the first page. In some implementations, the search system may also obtain suggested content for at least some of the responsive items assigned to the first page (615). A responsive item assigned to the first page may not have suggested content if, for example, the result is not understood, poorly marked up, or of low quality, is a new result, or a fringe topic. In some implementations, the suggested content may be sent with the initial page load. In some implementations, the suggested content may be "lazy loaded" after the initial page becomes visible. In some implementations, the suggested content may be downloaded as needed based on interactions with the page, e.g., fetched when a dwell score has reached or is approaching the threshold for displaying. Whether the suggested content is downloaded with the search result, lazy loaded, or loaded on demand may be based on the user's connection speed, the user's device, the position of a result on the page, etc.

The suggested content may be provided with the search results to the client, which renders the content. Thus, at the client device, at least some of the search results are visible in the viewport. Suggested content is not initially visible. Accordingly, the client displays at least the start of the first page of search results (620). The user of the client device may interact with the search results as is known, e.g., scrolling the search results and/or selecting one or more of the search results etc. While the user is actively scrolling (625, Yes) the system takes no action with regard to dwell scores. If the system receives a request for a next page of search results (630, Yes), the system may obtain the results for the next page (610). In some implementations, the ranking and selection of the items for the next page may depend at least in part on dwell scores calculated for items in the previous page or pages. In some implementations, the dwell scores may be included in session information.

Once a user stops scrolling (625, No) the system may calculate dwell scores (635). In particular, for each search result at least partially in the viewport the system may calculate a dwell score (640). In some implementations, the search results in the viewport can include suggested links such as suggested links 330, 330', 340, or 340' and/or expanded content, such as content 510. As described above, the dwell score may be based on a combination of factors. The factors include an amount of time the search result has been in the viewport. In some implementations, the dwell score may include a factor for a proximity of a cursor to the result. In some implementations, the dwell score may include a proximity of a gaze direction to the result. In some implementations, the dwell score may include a factor for a position of the result in the viewport. In some implementations, the dwell score may include a factor for an amount of a search result visible in the viewport. In some implementations, the dwell score may be a weighted combination of one or more factors. In some implementations the system may use a machine learned model to determine a dwell score.

In some implementations, the dwell scores may be sent back to the search engine, e.g., to update session information (655). If dwell scores are communicated back to the search engine, the search engine may use the scores as one of many signals in ranking and selecting responsive items, e.g., as part of step 610. In some implementations, the session information may include one dwell score for each item for which a dwell score is calculated. In some implementations, the session information may keep a history of dwell scores for responsive items that are calculated during the session.

In some implementations, if the dwell score of a search result meets a predetermined threshold (645, Yes), the system may inject suggested content (650). The injection may include displaying suggested links for the search result, e.g., suggested links 330, 330', 340 and/or 340'. The injection may include displaying collapsed content, e.g., content 510. The injection may cause other search results to be moved off the viewport (e.g., as illustrated in FIG. 3A and FIG. 5). If a search result is moved completely out of the viewport, the system stops calculating a dwell score for that result until it moves back into the viewport. In addition, the injected content may become a result for which a dwell score is calculated. Put another way, Step 650 can modify the search results for which a dwell score calculated as part of step 635.

The system may continue to periodically (e.g., continually, every second, every tenth of a second, at every interaction, etc., or some combination of these) calculate dwell scores as part of step 635 until either the user begins scrolling (a scroll action is received) or the user selects one of the search results. Of course, if a user switches focus to some other window or browser tab, process 600 may pause dwell score calculations. If the user has selected a search result (665, Yes), the system obtains the content for the selected result and may update session information (670). Process 600 then ends, although in some implementations the dwell scores for the results may stay in the session information until the browser is closed. Thus, if a user navigates back to the search result page, the dwell scores can be used as explained herein. If the user has not selected a search result (665, No) but has requested a next page of results (630, Yes), the system generates the next page of results (610), in some implementations using the dwell scores to inform and rank the responsive items represented in the next page.

FIG. 7 shows an example of a generic computer device 700, which may be operated as search engine 110 and/or client 170 of FIG. 1, which may be used with the techniques described here. Computing device 700 is intended to represent various example forms of computing devices, such as laptops, desktops, workstations, personal digital assistants, cellular telephones, smartphones, tablets, televisions, servers, and other computing devices, including wearable devices. The components shown here, their connections and relationships, and their functions, are meant to be examples only, and are not meant to limit implementations of the inventions described and/or claimed in this document.

Computing device 700 includes a processor 702, memory 704, a storage device 706, and expansion ports 710 connected via an interface 708. In some implementations, computing device 700 may include transceiver 746, communication interface 744, and a GPS (Global Positioning System) receiver module 748, among other components, such as a camera or cameras, touch sensors, keyboards, etc., connected via interface 708. Device 700 may communicate wirelessly through communication interface 744, which may include digital signal processing circuitry where necessary. Each of the components 702, 704, 706, 708, 710, 740, 744, 746, and 748 may be mounted on a common motherboard or in other manners as appropriate.

The processor 702 can process instructions for execution within the computing device 700, including instructions stored in the memory 704 or on the storage device 706 to display graphical information for a GUI on an external input/output device, such as display 716. Display 716 may be a monitor or a flat touchscreen display. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk. In some implementations, the memory 704 may include expansion memory provided through an expansion interface.

The storage device 706 is capable of providing mass storage for the computing device 700. In one implementation, the storage device 706 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 704, the storage device 706, or memory on processor 702.

The interface 708 may be a high speed controller that manages bandwidth-intensive operations for the computing device 700 or a low speed controller that manages lower bandwidth-intensive operations, or a combination of such controllers. An external interface 740 may be provided so as to enable near area communication of device 700 with other devices. In some implementations, controller 408 may be coupled to storage device 706 and expansion port 714. The expansion port, which may include various communication ports (e.g., USB, Bluetooth, Ethernet, wireless Ethernet) may be coupled to one or more input/output devices, such as a keyboard, a pointing device, a scanner, a camera or cameras, or a networking device such as a switch or router, e.g., through a network adapter.

The computing device 700 may be implemented in a number of different forms, as shown in the figure. For example, it may be implemented as a standard server 730, or multiple times in a group of such servers. It may also be implemented as part of a rack server system. In addition, it may be implemented in a computing device, such as a laptop computer 732, personal computer 734, or tablet/smart phone 736. An entire system may be made up of multiple computing devices 700 communicating with each other. Other configurations are possible.

FIG. 8 shows an example of a generic computer device 800, which may be search engine 110 of FIG. 1, which may be used with the techniques described here. Computing device 800 is intended to represent various example forms of large-scale data processing devices, such as servers, blade servers, datacenters, mainframes, and other large-scale computing devices. Computing device 800 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 800 may include any number of computing devices 880. Computing devices 880 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 880a includes multiple racks 858a-858n. Each rack may include one or more processors, such as processors 852a-852n and 862a-862n. The processors may include data processors, network attached storage devices, and other computer controlled devices. In some implementations, one processor may operate as a master processor and control the scheduling and data distribution tasks. Processors may be interconnected through one or more rack switches 858, and one or more racks may be connected through switch 878. Switch 878 may handle communications between multiple connected computing devices 800.

Each rack may include memory, such as memory 854 and memory 864, and storage, such as 856 and 866. Storage 856 and 866 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 856 or 866 may be shared between multiple processors, multiple racks, or multiple computing devices and may include a computer-readable medium storing instructions executable by one or more of the processors. Memory 854 and 864 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 854 may also be shared between processors 852a-852n. Data structures, such as an index, may be stored, for example, across storage 856 and memory 854. Computing device 800 may include other components not shown, such as controllers, buses, input/output devices, communications modules, etc.

An entire system may be made up of multiple computing devices 800 communicating with each other. For example, device 880a may communicate with devices 880b, 880c, and 880d, and these may collectively be known as search engine 110. As another example, search engine 110 of FIG. 1 may include two or more computing devices 800. Some of the computing devices may be located geographically close to each other, and others may be located geographically distant. The layout of system 800 is an example only and the system may take on other layouts or configurations.

According to certain aspects of the disclosure, a method comprises, for each result at least partially displayed in a viewport, the result being part of a reduced set of results identified in response to a query, calculating a dwell score for the result based on an amount of time the result has been in the viewport and a position of the result in the viewport, and responsive to determining that the dwell score meets a threshold, displaying suggested links for the result in the viewport.

These and other aspects can include one or more of the following, alone or in combination. For example, the dwell score may be calculated based on an amount of time the result has been in the viewport, a position of the result in the viewport, and a distance of the result from a cursor. As another example, the dwell score may be calculated based on an amount of time the result has been in the viewport, a position of the result in the viewport, and a percentage of the result that is in the viewport. As another example, displaying the suggested links may include inserting the suggested links into a page element for the result, displaying the suggested links in a sidebar anchored to the result, or replacing the result with the suggested links. As another example the method may also include updating ranking signals based on the dwell score. In some implementations, the method may also include determining that a last result of the reduced set of results is displayed in the viewport and that a next page is requested, requesting additional search results, and displaying at least some of the additional search results, the additional search results being selected in part using the updated ranking signals, wherein the additional search results are a second reduced set of search results. As another example, the suggested links represent both content similar to the result and content tangential to the result.

According to certain aspects of the disclosure, a method includes receiving a query from a client device, determining a first plurality of search results from an inverted index that are responsive to the query, and providing the first plurality of search results for display in a viewport at the client device. The method may also include receiving a dwell score for at least a first result of the first plurality of search results, receiving a request for a next page of search results, determining a second plurality of search results from the inverted index that are responsive to the query, and ranking the second plurality of search results based on part on the dwell score so that results from the second plurality of search results that are similar to the first result receive a boost in rank.

These and other aspects can include one or more of the following features, alone or in combination. For example, the number of search results in the first plurality of search results may be a small multiple of the number of search results that fit in the viewport. As another example, the dwell score may be received responsive to the dwell score meeting a threshold. As another example, the dwell score may be calculated based on an amount of time the first result has been in the viewport, a position of the first result in the viewport, and a distance of the first result from a cursor. As another example, the dwell score may represent an amount of time the first result has been in the viewport, a position of the first result in the viewport, and a percentage of the first result that is in the viewport. As another example, the first plurality of search results may be determined using at least one dwell score for a result previously displayed in the viewport. As another example, ranking the second plurality of search results may include boosting a rank of a result responsive to determining that the result has a same category as a result in the first plurality of search results that has a respective dwell score that meets a threshold.

According to certain aspects, a method includes displaying a scrollable set of search results in a viewport, wherein the set of search results represents a reduced set of search results responsive to a query, and, while waiting for a scroll action or link selection, calculating, for each result in the set of search results that has content visible in the viewport, a respective dwell score and updating ranking signals based on the respective dwell scores, wherein the updated ranking signals are used to generate a next set of search results responsive to the query responsive to a request for a next page of search results.

These and other aspects may include one or more of the following, alone or in combination. For example, responsive to determining that the respective dwell score for a first search result of the set of search results meets a threshold, the method may also include displaying suggested links for the first search result in the viewport. In some implementations, the suggested links may include at least one link associated with content that is tangential to content associated with the first search result and at least one link associated with content that is similar to the content associated with the first search result. As another example, using the updated ranking signals to generate the next set of search results may include boosting a rank of a result responsive to determining that the result is similar to a result in the set of search results that has a respective dwell score that meets a threshold. As another example, the respective dwell score for a result may be calculated based on at least two of an amount of time the result has been in the viewport, a position of the result in the viewport, a distance of the result from a cursor, or a percentage of the result that is in the viewport.

According to one aspect, a system includes a means of generating a dwell score for at least one result in a shortened set of search results that are responsive to a query and a means of using the dwell score to generate a second shortened set of search results that are responsive to the query. According to one aspect, a system includes a means of generating a dwell score for at least one result in a set of search results and a means for injecting suggested links in the search result page based on the dwell scores.

According to certain aspects of the disclosure, a system comprises at least one processor (formed in a substrate) and a memory storing instructions that cause a computing device to perform any of the methods and their variations disclosed herein.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
for each result at least partially displayed in a viewport, the result being part of a reduced set of results identified in response to a query:
calculating a dwell score for the result based on an amount of time the result has been in the viewport and a position of the result in the viewport; and
responsive to determining that the dwell score meets a threshold, displaying suggested links for the result in the viewport including replacing the result with the suggested links.

2. The method of claim 1, wherein the dwell score is a weighted combination of a factor indicating the amount of time the result has been in the viewport, a factor indicating the position of the result in the viewport, and a factor indicating a distance of the result from a cursor.

3. The method of claim 1, wherein the dwell score is a weighted combination of a factor indicating the amount of time the result has been in the viewport, a factor indicating the position of the result in the viewport, and a factor indicating a percentage of the result that is in the viewport.

4. The method of claim 1, wherein displaying the suggested links includes inserting the suggested links into a page element for the result.

5. The method of claim 1, wherein displaying the suggested links includes displaying the suggested links in a sidebar anchored to the result.

6. The method of claim 1, wherein the method further comprises:
updating ranking signals based on the dwell score.

7. The method of claim 6, wherein the method further comprises:
determining that a last result of the reduced set of results is displayed in the viewport and that a next page is requested;
requesting additional search results; and
displaying at least some of the additional search results, the additional search results being selected in part using the updated ranking signals,
wherein the additional search results are a second reduced set of search results.

8. The method of claim 1, wherein the suggested links represent both content similar to the result and content tangential to the result.

9. A system comprising:
at least one processor;
a display device; and
memory storing instructions that, when executed by the at least one processor, cause the system to perform operations including:
for each result at least partially displayed in a viewport, the result being part of a reduced set of results identified in response to a query:
calculating a dwell score for the result based on an amount of time the result has been in the viewport and a position of the result in the viewport; and
responsive to determining that the dwell score meets a threshold, displaying, on the display device, suggested links for the result in the viewport including replacing the result with the suggested links.

10. The system of claim 9, wherein the dwell score is a weighted combination of a factor indicating the amount of time the result has been in the viewport, a factor indicating the position of the result in the viewport, and a factor indicating a distance of the result from a cursor.

11. The system of claim 9, wherein the dwell score is a weighted combination of a factor indicating the amount of time the result has been in the viewport, a factor indicating the position of the result in the viewport, and a factor indicating a percentage of the result that is in the viewport.

12. The system of claim 9, wherein displaying the suggested links includes inserting the suggested links into a page element for the result.

13. The system of claim 9, wherein displaying the suggested links includes displaying the suggested links in a sidebar anchored to the result.

14. The system of claim 9, wherein the operations further include:
updating ranking signals based on the dwell score.

15. The system of claim 14, wherein the operations further include:
determining that a last result of the reduced set of results is displayed in the viewport and that a next page is requested;
requesting additional search results; and
displaying at least some of the additional search results, the additional search results being selected in part using the updated ranking signals,
wherein the additional search results are a second reduced set of search results.

16. The system of claim 9, wherein the suggested links represent both content similar to the result and content tangential to the result.

17. A non-transitory computer-readable medium storing instructions that, when executed by a processor of a computing device, cause the computing device to:
for each result at least partially displayed in a viewport, the result being part of a reduced set of results identified in response to a query:
calculate a dwell score for the result based on an amount of time the result has been in the viewport and a position of the result in the viewport; and
responsive to determining that the dwell score meets a threshold, display suggested links for the result in the viewport including replacing the result with the suggested links.

18. The non-transitory computer-readable medium of claim 17, wherein displaying the suggested links includes inserting the suggested links into a page element for the result.

19. The non-transitory computer-readable medium of claim 17, wherein displaying the suggested links includes displaying the suggested links in a sidebar anchored to the result.

20. The non-transitory computer-readable medium of claim 17, wherein the instructions, when executed, further cause the computing device to:
update ranking signals based on the dwell score.

21. The non-transitory computer-readable medium of claim 20, wherein the instructions, when executed, further cause the computing device to:
determine that a last result of the reduced set of results is displayed in the viewport and that a next page is requested;
request additional search results; and
display at least some of the additional search results, the additional search results being selected in part using the updated ranking signals,
wherein the additional search results are a second reduced set of search results.

* * * * *